United States Patent
Beretta et al.

(10) Patent No.: US 9,098,487 B2
(45) Date of Patent: Aug. 4, 2015

(54) CATEGORIZATION BASED ON WORD DISTANCE

(71) Applicant: HEWLETT-PACKARD DEVELOPMENT COMPANY, L.P., Houston, TX (US)

(72) Inventors: Giordano B Beretta, Palo Alto, CA (US); Samson J Liu, Palo Alto, CA (US); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 321 days.

(21) Appl. No.: 13/688,782

(22) Filed: Nov. 29, 2012

(65) Prior Publication Data

US 2014/0149106 A1 May 29, 2014

(51) Int. Cl.
G06F 17/27 (2006.01)
G06K 9/00 (2006.01)

(52) U.S. Cl.
CPC .......... *G06F 17/273* (2013.01); *G06K 9/00456* (2013.01)

(58) Field of Classification Search
CPC ............. G06F 17/30; G06F 7/06; G06F 7/10; G06K 9/00; G06K 9/28; G06K 9/72; G10L 15/26
USPC ........... 704/9, 251, 235, 10; 726/22; 715/257, 715/236; 707/770, 767, 739, 737, 736, 724, 707/723, 722; 705/1.1; 382/229, 201, 182, 382/100; 380/28; 358/1.15; 345/440, 173
See application file for complete search history.

(56) References Cited

U.S. PATENT DOCUMENTS

| | | | | |
|---|---|---|---|---|
| 5,329,609 A * | 7/1994 | Sanada et al. | ................. | 704/251 |
| 5,617,488 A * | 4/1997 | Hong et al. | ................... | 382/229 |
| 6,018,736 A * | 1/2000 | Gilai et al. | ............................ | 1/1 |
| 6,104,500 A * | 8/2000 | Alam et al. | .................. | 358/1.15 |
| 6,154,549 A | 11/2000 | Arnold et al. | | |
| 6,629,097 B1 * | 9/2003 | Keith | .................................. | 1/1 |
| 6,937,238 B2 * | 8/2005 | Hao et al. | ...................... | 345/440 |
| 7,627,177 B2 | 12/2009 | Tzadok et al. | | |
| 8,423,538 B1 * | 4/2013 | Sadikov et al. | ............... | 707/722 |
| 8,463,782 B1 * | 6/2013 | Upstill et al. | .................. | 707/736 |
| 8,798,988 B1 * | 8/2014 | Upstill et al. | ..................... | 704/9 |
| 2003/0018670 A1 * | 1/2003 | Ashford et al. | ............... | 707/532 |
| 2005/0108001 A1 * | 5/2005 | Aarskog | ........................ | 704/10 |
| 2007/0040813 A1 * | 2/2007 | Kushler et al. | ................ | 345/173 |
| 2008/0033738 A1 * | 2/2008 | Conard et al. | ...................... | 705/1 |
| 2008/0063276 A1 * | 3/2008 | Vincent et al. | ............... | 382/182 |
| 2008/0319978 A1 * | 12/2008 | Brun et al. | ........................ | 707/5 |

(Continued)

OTHER PUBLICATIONS

Bunke, H., "A Fast Algorithm for Finding the Nearest Neighbor of a Word in a Dictionary", Nov. 1993.

(Continued)

*Primary Examiner* — Michael Colucci
(74) *Attorney, Agent, or Firm* — HP Legal Department; Sarah E Burrows (57) ABSTRACT

Examples disclosed herein relate to categorizing a target word based on word distance. A processor may determine a difference level threshold for a category based on difference levels between words associated with the category and determine difference levels between a target word and the words associated with the category. If one of the difference levels of the target word is below the threshold associated with the category, the processor outputs the category.

17 Claims, 4 Drawing Sheets

(56) References Cited

U.S. PATENT DOCUMENTS

| | | | |
|---|---|---|---|
| 2009/0122979 A1* | 5/2009 | Lee et al. | 380/28 |
| 2010/0228733 A1* | 9/2010 | Harrison et al. | 707/739 |
| 2011/0093452 A1* | 4/2011 | Jain | 707/723 |
| 2011/0131241 A1* | 6/2011 | Petrou et al. | 707/770 |
| 2012/0087537 A1* | 4/2012 | Liu et al. | 382/100 |
| 2012/0191745 A1* | 7/2012 | Velipasaoglu et al. | 707/767 |
| 2012/0227104 A1* | 9/2012 | Sinha et al. | 726/22 |
| 2012/0290577 A1* | 11/2012 | Cai et al. | 707/737 |
| 2013/0061139 A1* | 3/2013 | Mahkovec et al. | 715/257 |
| 2013/0080164 A1* | 3/2013 | Zanolin et al. | 704/235 |
| 2013/0216138 A1* | 8/2013 | Yu et al. | 382/201 |
| 2013/0218879 A1* | 8/2013 | Park et al. | 707/724 |

OTHER PUBLICATIONS

Niklas, K, "Unsupervised Post-Correction of OCR Errors", Jun. 11, 2010.

Rose, T.G. et al, "Text Recognition Using Collocations and Domain Codes", 1993.

Taghva, K, et al, "An Expert System for Automatically Correcting OCR Output", 1994.

\* cited by examiner

CATEGORIZATION BASED ON WORD DISTANCE

BACKGROUND

Paperwork is increasingly being scanned for digital processing, and the paper-based information may be associated with electronic workflows. Automatic processing may be used for documents such as receipts, medical records, invoices, and other documents. For example, optical character recognition (OCR) may be used to automatically recognize typed or hand written material that may then be stored digitally.

BRIEF DESCRIPTION OF THE DRAWINGS

The drawings describe example embodiments. The following detailed description references the drawings, wherein.

DETAILED DESCRIPTION

Semi-structured documents may consist of labeled fields but without a known layout. A semi-structured document may be a form organized in blocks and fields of data where the layout is arbitrary or unknown. Examples of semi-structured documents include invoices, receipts, and explanations of medical benefits. It is desirable to be able to process semi-structured forms into standardized terms independent of form layout.

An automated method may attach meaning to extracted text from semi structured documents. For example, in the case of processing a form, the form may contain paired label and information fields to be processed. To make the information fields more meaningful, it may be desirable to categorize the labels. For example, a label of "phone", "phone number", or "telephone" may be categorized to the same "telephone" category. The information may be saved in a database using information from the determined categories. Categorizing the label may allow for the information to be stored and used in a more uniform manner for the use of the information across multiple forms and purposes. The categorization may be used for, for example, scanned document images, HTML forms, PDF forms, property lists, and cloud service transactions.

In one implementation, a target word, such as a potential form label, is automatically categorized based on a comparison of the target word to words associated with a category. The target word may be any suitable term, such as a word, phrase, abbreviation, or acronym. A category specific threshold for the degree of difference between the target word and the words associated with the category may be used to determine if the target word is related to the category. For example, a threshold indicating a difference level among the words associated with the category may be determined. The target word may be compared to the words associated with the category to determine if a difference level between the target word and at least one of the words associated with the category is below the difference level threshold for the category. The difference level between two words may indicate a difference in spelling and/or meaning, for example, due to synonyms or mistypings.

The automatic categorization method may be used on misspellings and mistypings common in converting to and processing electronic text. Optical character recognition may introduce misspellings that may be correctly associated with the correct category despite the different spelling. A spell checker applied to electronic text may also introduce errors by correcting to an unintended word. In addition, the underlying paper text may include misspellings or mistypings. An automated categorization method may be used on merged electronic texts or merged scanned and electronic text, and both misspellings and mistypings may be corrected using the categorization method.

Using a category specific threshold for determining whether a new word may be added to the category may allow for multiple types of related words to be correlated. For example, misspellings may have more predictable difference amounts across multiple categories than the relatedness of abbreviations, metonyms, synecdoches, metalepsises, kennings, or acronyms. A higher difference threshold may be used to associate words with a similar meaning. As an example, a similarity measure of a misspelling may be much closer than a similarity measure between synonyms and metonym, but a target word may be more accurately categorized where synonyms, abbreviations, figures of speech, and other associations between words are taken into account. For example, different methods of measuring the distance or different distance thresholds may be used to account for different types of relationships, such as semantic versus syntactic relationships, between words.

Figure 1:
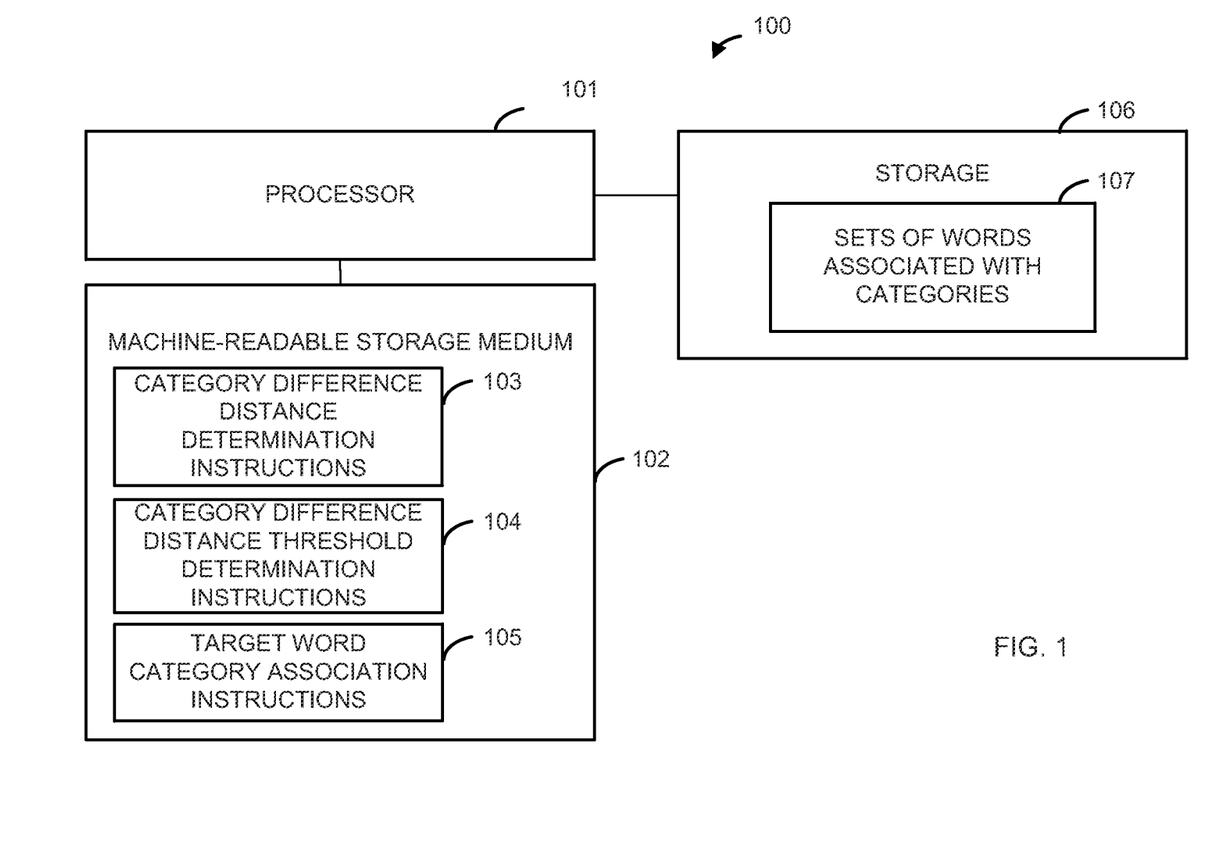
FIG. 1 is a block diagram illustrating one example of a computing system to categorize a target word based on word distance.

FIG. 1 is a block diagram illustrating one example of a computing system to categorize a target word based on word distance. The computing system 100 includes a processor 101, a machine-readable storage medium 102, and a storage 106. The computing system 100 may be included in a single apparatus or multiple apparatuses communicating with one another, such as via a network. In one implementation, the computing system 100 is associated with a scanner for scanning paper documents.

The computing system 100 may categorize a word using a word distance threshold specific to the potential categories. For example, a threshold may be determined for each potential category. A distance of a target word from a category may be determined, and the distance may be compared to the threshold for that category to determine if the target word should be associated with the particular category.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The storage 106 may be included with the machine-readable storage medium 102 or may be a separate storage device. The storage 106 may be a storage remote from the processor that the processor 101 communicates with via a network. The storage 106 may store a set of words 107 associated with categories where each category has a set of words that are related to the particular category. The words associated with the category may be words related to the category in any suitable manner. For example, the words may include misspellings, abbreviations, metonyms, synecdoches, metalepses, kennings, or acronyms. The words may be associated with the category in any suitable manner. The words may be manually added, automatically clustered with a category, or a combination of manual and automatic methods may be used. Multiple sets of words, such as synonyms, each associated with a category may be created by a domain specialist. The set of words 107 may correspond to a thesaurus for a category.

The set of words 107 may be stored on permanent storage media. A user interface may be generated to allow a user to maintain the set of words 107. For example, a user may add a synonym, add a category, or delete a synonym.

The set of words 107 may be stored in any suitable manner, such as in a database or text file. The set of words 107 may be read from the storage 106 and stored in a data structure, such as a hash table. In one implementation, there is a file directory with an ASCII text file for each category. The ASCII text file may include the words associated with the category, and the name of the file may correspond to the category name. At run time, the files may be loaded into volatile memory in an abstract data type allowing for faster retrieval.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium.

The machine-readable storage medium 102 may include instructions executable by the processor 101, such as category difference distance determination instructions 103, category difference distance threshold determination instructions 104, and target word association instructions 105. The instructions may be executed by the processor 101 to associate a category with a target word.

The category difference distance determination instructions 103 may include instruction to determine difference distances between the words within each of the individual categories. The amount of difference between the words in a category may vary based on the category. For example, the category "amount" with "amount", "total", and "price" includes words more varied from one another than a category "name" including "first name" and "last name" in the category. The intra-category difference distance may be determined based on the number of edits used to change a first word in the category into a second word in the category, such as using additions, deletions, substitutions, and transpositions. For example, a Levenshtein distance or Damerau-Levenshtein distance may be used. In one implementation, a different distance measuring method is used for different types of relationships, such as semantic versus syntactic relationships. For example, a first method may be used to detect metonyms and synonyms and a second method may be used to detect misspellings and mistypings.

The category-specific difference distance threshold determination instructions 104 may include instructions to select a difference distance threshold for each of the categories based on the word difference distances for the particular category. The difference between the words associated with the category may be used to determine a tolerance for how different a new word not included within the category should be to be associated with the category. In one implementation, the threshold for a category is based on the greatest distance between any two words associated with the category.

In one implementation, there are multiple thresholds for a category based on different types of relationships, such as a lower difference distance for misspellings than for synonyms. In some cases, a word may be detected as a misspelling because of a low difference distance to another word in a category. A higher threshold may also be used such that a word may be associated with a category of the higher threshold that may indicate a semantic relationship instead. In some implementations, additional criteria may be used to determine which category to select of a subset of categories where a word has a difference distance below the category specific threshold. For example, a target word may appear a possible mistyping to one category and a possible synonym of another. Contextual criteria may be used to determine which category to select.

The target word association instructions 105 may include instructions to categorize the target word. The target word may be compared to the sets of words 107. A difference distance to the set of words of each of the categories may be determined. For example, a distance of the target word to each of the words associated with a category may be determined. A summary value such as the maximum or minimum difference distance among the distance difference between the target word and the words in the category may be determined. In one implementation, the summary value is the pair-wise minimum distance between the target word and any of the words associated with the category. The summary value may be compared to the threshold for the particular category to determine if the target word should be associated with the particular category. For example, the threshold for the category may indicate the maximum difference allowed for the category. The minimum difference distance of the target word to any of the words within the set may be compared to that threshold such that the target word may be associated with the category if the minimum distance is below the maximum tolerated difference for the category.

The category may be output if the difference distance of the target word is below the threshold. For example, the category may be stored, displayed, or transmitted. The categories may be used such that a newly associated target word that is not included as any of the original associated words of the categories may be associated with one of the categories based on the discovered word relationship to the category name and/or the words associated with the category. The target word may be retrieved such as from optical character recognition or otherwise automatically processing a scanned form. In some cases, the categorization may be used to associate the target word with a category where the target word is a form label, and a paired value may be stored associated with the category.

Figure 2:
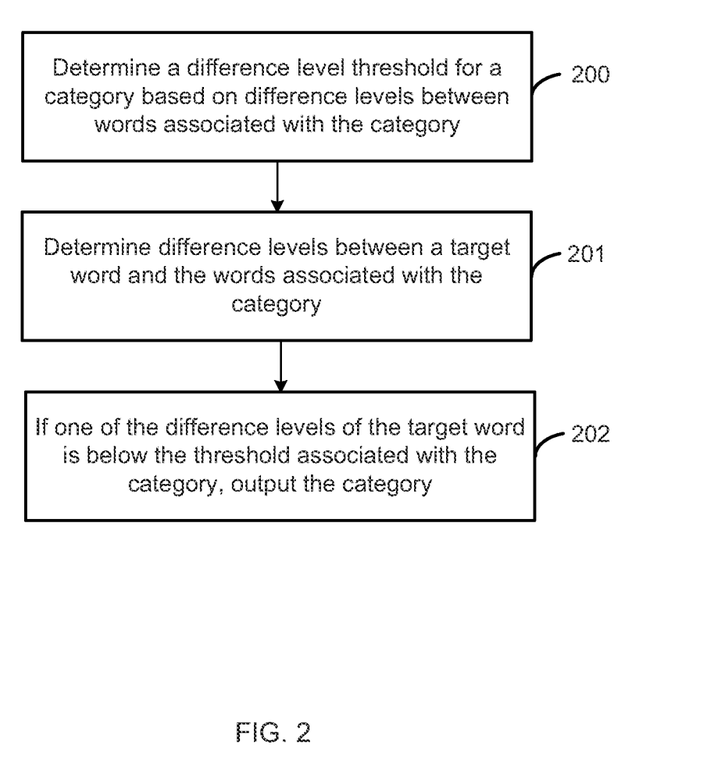
FIG. 2 is a flow chart illustrating one example of a method to categorize a target word based on word distance.

FIG. 2 is a flow chart illustrating one example of a method to categorize a target word based on word distance. A target word may be associated with a category based on a category specific difference threshold. A category may include a set of words associated with the category, and a tolerance for the degree of difference between a target word and the set of words may be determined for each individual category. The tolerance for difference between the target word and the words associated with the category may be based on a category-specific threshold. For example, a target word difference distance from a first and second category may be determined. The first category may have a higher threshold than the second category such that a target word may be associated with the first category even though the target word has a difference distance with the first category above the threshold used for the second category.

The allowed degree of difference may be determined based on the degree of difference between the words within the set associated with the category. For example, if the set known to be associated with the category vary largely from one another, a target word to be associated with the category may also vary largely from the associated category words. If the set of words associated with a category are much more similar, a target word that varies greatly may indicate that the word is not a good fit for the particular category. The method may be implemented, for example, by the processor 101 of FIG. 1.

Beginning at 200, a processor determines a difference level threshold for a category based on difference levels between words associated with the category. The words associated with the category may be written or audible words. The words may be individual words or phrases. The words may include letters, numbers, symbols, and pictograms. The words may be abbreviations, acronyms, or other representations.

The category may have a thesaurus of associated words that includes synonyms and other related words to the category. The category may be manually formed by a user associating words with the category, effectively a manually created thesaurus. In some implementations, the category may be partially or completely created by a processor, such as using a clustering or other method for organizing content. Words of a semantic and syntactic similar nature may be identified based on their relationships to the words in the category thesaurus.

The categories and associated words may be stored, for example, in a text the such that each text file represents a category with related words stored one word per line. The name of the file may be used as the category name. Other implementations include databases, ontologies, or other storage and retrieval methods. The difference information for the words of a category may be stored in a separate file, or in a common database or other storage.

The difference level threshold may be determined in any suitable manner. In one implementation a Levenshtein distance, also called an edit distance, is used. The Levenshtein distance may be determined between two strings based on the minimum number of edits used to transform one string into the other using insertion, deletion, or character substitution. In one implementation the difference level threshold may be determined using a Damerau-Levenshtein distance which also allows for edits using transpositions between characters. In one implementation, multiple types of methods for determining a difference level are available, and the processor automatically selects a method based on additional criteria.

The threshold of the category may be determined in any suitable manner. In one implementation, the pair-wise difference distance between each pair of words associated with the category is determined, and the threshold is selected based on a comparison of the pair-wise difference distances. For example, the pair-wise difference distance that is the greatest may be used as the threshold. The system may include multiple categories with varying difference distance thresholds. A misspelling may in some cases include a similar threshold for each category, but the type of synonyms or other words related to a category may cause the thresholds for the categories to be unique.

The threshold may be further based on a system wide parameter common to multiple categories. For example, there may be a global threshold, and a category with a threshold above the global threshold may have its threshold changed to the global threshold. Implementing a cap may allow for more varied words to be associated with the category in a manual fashion while still providing tighter control over those words being automatically associated with the category.

In one implementation, a category may have multiple thresholds, such as a first threshold associated with misspellings and a second threshold associated with synonyms. A target word may be associated with the category and a relationship to the category based on how the target word relates to the different thresholds.

Post-processing may be performed on the determined threshold. For example, the distance between the individual words of the category or the summary value threshold of the category may be further refined. As an example, the distance between the individual words may be refined by an epsilon factor.

Continuing to 201, a processor determines difference levels between a target word and the words associated with the category. The target word may be a word or phrase and may include letters, numbers, symbols, and pictograms. The word words may be an abbreviation, acronym, or other representation. In one implementation, the target word is extracted from a form automatically using optical character recognition.

The difference level between the target word and the associated category may be determined in the same manner as the difference distance used for the threshold of the category. For example, a Levenshtein or Damerau-Levenshtein distance may be used. In one implementation, a criterion is used to select the method for determining the difference level based on a characteristic of the target word or the category, such as the font used for the target word. The processor may determine the difference distance between the target word and each of the words associated with the category or a subset of words associated with the category, such as the category name. The processor may select a subset of categories for comparison to the target word based on the topic of a form or document from which the target word is extracted.

The processor may determine a summary value related to the difference levels of the target word. For example, the processor may determine the maximum or minimum difference level between the target word and any word in the category. The processor may determine aggregate information related to a difference level between the target word and more than one word associated with the category. In one implementation, multiple thresholds are combined within a category to create a summary difference value. A first threshold may be used for syntactic differences and a second threshold may be used for semantic differences. For example, the difference between "price" and "pride" may be a syntactic difference, and the difference between "price" and "total" may be a semantic difference.

A value indicating the relationship between the word and category may involve both the difference distance and additional criteria. As an example, a target word "pride" may be compared to "price" and "total". Factors in addition to the threshold may be analyzed to provide a probability of a mistyping, such as the proximity of "d" and "c" on a QWERTY keyboard indicating likelihood of a mistyping of "price".

In one implementation, the processor performs natural language processing on the words associated with the category and/or the target word. For example, natural language processing techniques, such as lemmatization, may be used such that related words are matched. For example, words of different tenses may be cropped and compared prior to determining the difference distance. Other preprocessing may include, for example, selecting a subset of words of a phrase for comparison to a category instead of or in addition to the entire phrase, such as using "phone" for the phrase "phone #".

In one implementation, the processor may stop comparing the target word to associated words of a particular category and move to the next category for comparison. It may be desirable for speed considerations to set a limit that indicates that a match is unlikely to be found in a particular category. If the target word is very distant from each word in the category, the comparison to the particular category may be aborted. For example, if the distance between each of the first five words of the category is more than double the threshold of the category, the processor may move to the next category.

The processor may first compare the target word to the words associated with the category to determine if there is an exact match. If there is not an exact match, the processor may proceed to compare the target word to the words in the category to determine the difference level. In some cases, the word may be one already associated with the category and a distance level comparison of the target word is not performed.

Moving to 202, if one of the difference levels of the target word is below the threshold associated with the category, a processor outputs the category. In one implementation, a target word is associated with the first category analyzed where the difference distance of the target word to a category word is less than the threshold for the particular category. In one implementation, an additional criterion is used to associate the target word with the category. For example, the processor may continue to analyze the remaining categories, and the category with a word with the smallest difference distance from the target word where the difference distance is also below that category threshold may be used. In some implementations, the smallest distance as a percent of the threshold for the category may be used.

In some cases, no category with a distance below the threshold may be identified. For example, the target word may not be related to any of the categories, such as where a company name or other information is extracted using optical character recognition that is not related to any categories common to multiple forms. The processor may output information to indicate that no match is found. In some cases, the processor may indicate that the target word is not a form label for a label value pair if an associated category is not identified.

The category may be stored with the target word, transmitted, or displayed. In one implementation, the target word is a label that has an associated information field, and the information field is stored with information indicating the selected category.

The categorization information may be output for verification. For example, semi-structured documents may be used in applications such as accounting, auditing, and fiduciary institutions where processing accuracy is of great importance. In some cases, a human verifier may be used in addition to an automated categorization method. An automated categorization method may increase the efficiency of the human verifier.

In one implementation, there are multiple types of lists of words associated with a category, such as one for misspellings and mistypings and one for synonyms. The difference level for a target word to be determined to be a misspelling may be much smaller than the difference level for the target word to be classified as a synonym. In one implementation, a processor outputs both the category and information about the type of relationship to the category.

In one implementation, the difference distance information may be used to determine a name for the category, and the name of the category may be the category information that is output and associated with the target word. Initially, a category may be provided manually by a person setting up the thesaurus of categories and associated words. The pair-wise difference distance of words associated with the category may be compared. The word within the category that is most closely related to the most words may be selected for the category name. For example, we can select as a category name the term with the shortest distance to the other terms in the category. As an example, a category "phone" may be renamed to "tel", In some cases, the category name may further be used to associate a target word. For example, a target word may first be compared to a category name to determine if the distance between the target word and category name is below the category threshold. In some implementations, there may be a second threshold such that if the distance from the category name and the target word is greater than a particular distance then the individual words associated with the category are not compared to the target word.

Figure 3:
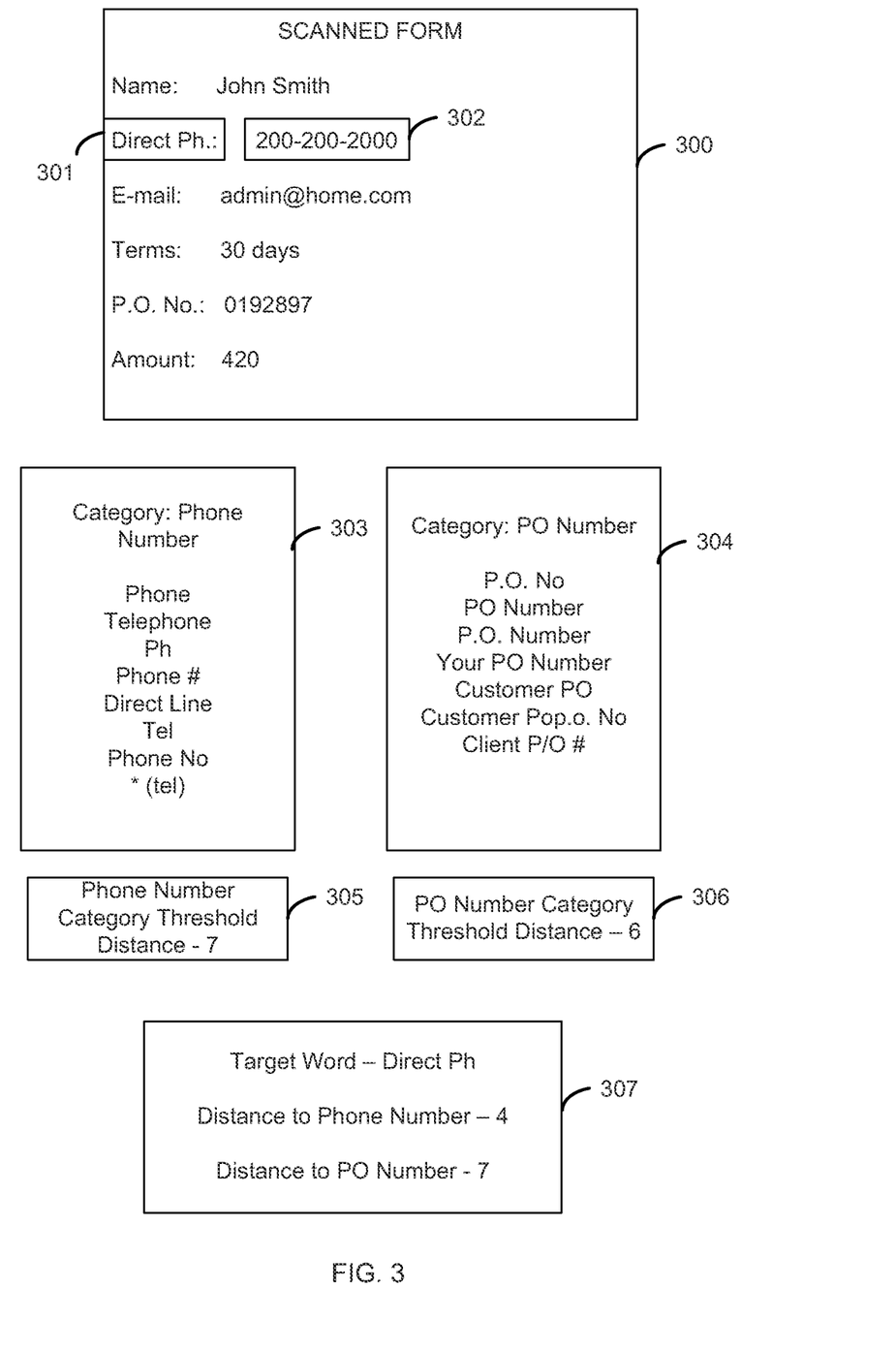
FIG. 3 is a diagram illustrating one example of categorizing a label on a scanned form.

FIG. 3 is a diagram illustrating one example of categorizing a label on a scanned form. Information may be automatically read from a scanned form, such as using optical character recognition. It may be useful to categorize labels on the scanned form such that the information associated with the labels may be stored in a more uniform format despite differences in label names. Storing information uniformly may allow the information to be more easily shared and correlated across multiple forms and databases.

The scanned form 300 includes labels and fields for a user to provide information. The label 301 includes label "Direct Ph". The associated information field 302 includes a user provided phone number. Two categories and their associated set of words are shown. The category 303 for "phone number" includes a set of words that includes different words that may be used for phone number, such as abbreviations and synonyms. The list may be manually compiled in some cases. The category 304 for "po number" includes a set of words that are different synonyms for purchase order number. Block 305 shows the difference threshold for category 303 for "phone number" being smaller than the difference threshold of block 306 for category 304 for "po number" because the set of words for "phone number" are more similar to one another than those for "po number". The threshold may be determined based on the maximum distance between any two words in associated with the category plus an epsilon factor. Because the thresholds are different, a new word to be categorized as a "phone number" may be more closely related to the set of words than a new word to be categorized as "po number".

The target word "Direct Ph" may be compared to each word associated with "phone number" and each word associated with "po number". The smallest distance between "Direct Ph" and the "phone number" category is shown in block 307 to be 4, and the smallest distance between "Direct Ph" and the "po number" category is shown in block 307 to be 7. For example, the Levenshtein Distance from "Direct Ph" to "direct line" is 4, and the Levenshtein Distance from "Direct Ph" to "Client P/O #" is 7. The target word is shown to have a distance to the "phone number" category below the category threshold of 7 and a distance to the "po number" category above the category threshold of 6. "Direct Ph" may be added to the "phone number" category even though it does not appear in the list of words associated with the "phone number" category. In some cases, the word associated with the category may be a misspelling, synonym, abbreviation, metonym, synecdoche, metalepsis, kenning, or acronym.

Figure 4:
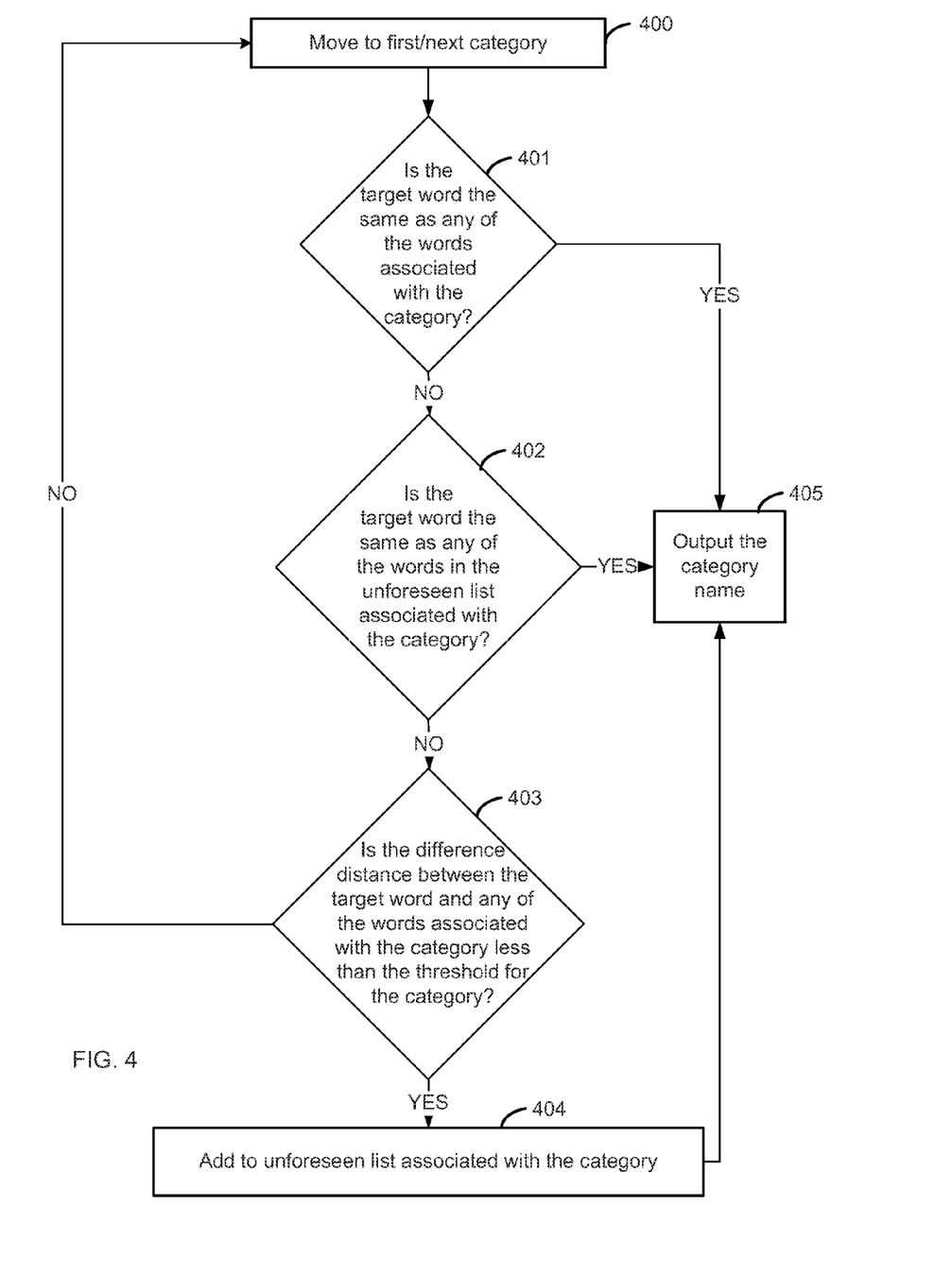
FIG. 4 is a flow chart illustrating one example of a method to categorize a target word based on word distance.

FIG. 4 is a flow chart illustrating one example of a method to categorize a target word based on word distance. Two separate lists of words may be associated with each category. For example, a first list of words may be initially associated with the category. The second set of words may include words associated with the category based on the automated method. These words may be stored separately to create a more efficient system such that they are not checked again, but a list of unforeseen words that are matched to a category may be used for quicker look up without distorting the categorization results. Storing the words separately may allow a domain expert to quickly review the words to determine if they should be added to the words associated with the category. In addition, including these words within the set of words associated with the category for difference distance determinations may cause the difference distances to slowly become larger over time.

Beginning at block 400, a processor starts with the first category or moves to the next category. Moving to 401, a processor determines if the target word is the same as any of the words associated with the current category. If so, continuing to 405, the category name is output. For example, in some cases, the target word may be an exact match to a word already included in the set of words. The set of words associated with a category may be larger to increase the chances of an exact match.

If the target word is not found in the first list, moving to 402, the processor checks a list of unforeseen words associated with the category. The unforeseen list may include words automatically added to the category based on the difference distance threshold. If the target word matches one of the words in the list, the processor moves to 405 to output the category name.

If the target word is not found in the list, moving to 403, the processor determines if the difference distance between the target words and any of the words in the first list associated with the category is less than the category specific threshold. If so, at block 404, the target word is added to the unforeseen list associated with the category such that the target word may be checked automatically next time without determining a difference level associated with the target word as compared to the words associated with the category. The distance level between the target word and category may be added where the target word is added to the unforeseen list or associated with the unforeseen list. In some cases, a confidence measure may be determined based on the distance and/or the difference between the distance and the threshold. The distance from the category may also be output, for example, to provide a confidence measure. Then, moving to block 405, the category is output. In some cases, a user may review the unforeseen list at a later time and determine whether to add the words to the primary list of words associated with the category. In some implementations, the user may set up a third list of words not to associate with a category, and the processor may compare the target word to the list and move to the next category if the target word is in the list. For example, a user may discover a word with a distance below a threshold with a category that was added to the unforeseen list, but the target word may be determined not to be related to the category.

If not, the processor moves to analyze the next category to follow the same process until a category is selected or until determined that the target word does not relate to any of the available categories. For example, there may be a set of categories to analyze where each of the categories has a list of associated words and a second list of unforeseen words assigned to the category based on the difference threshold. In some cases, a target word may not be similar to any of the categories, and the target word may be stored or used as a unique word not associated with a category.

In one implementation, further analysis is performed after each category with a difference level above the threshold for the category is identified. For example, the category with a target word difference level the farthest below or greatest percentage below the threshold may be selected as the category to associate with the target word.

A difference distance may be used to effectively categorize words in an automatic manner. Using a category specific threshold for associating a target word with a category may allow for the category to be used for different types of word associations that reflect the large possibilities of relationships between words.

The invention claimed is:

1. A computing system, comprising:
    a storage to store:
        sets of words, wherein each set is associated with a category; and
    a processor to:
        determine difference distances between the words within each of the individual categories;
        select a difference distance threshold for each of the categories based on a comparison of the determined difference distances between the words in the particular category;
        associate a category with a target word, comprising:
            determine difference distances of the target word to the set of words of each of the categories; and
            determine whether one of the difference distances of the target word is below a threshold associated with the category; and
            output the category if the difference distance of the target word is below the threshold.

2. The computing system of claim 1, wherein the target word comprises a word determined using optical character recognition.

3. The computing system of claim 1, wherein associating a category with the target word comprises associating the target word with the category based on the difference between the threshold for the category and the target difference distance.

4. The computing system of claim 1, wherein the processor is further to compare the target word to the set of words of at least one category.

5. The computing system of claim 1, wherein the processor is further to:
    associate the target word with a list of discovered words associated with the output category; and
    compare a future word to the list of discovered words associated with the output category.

6. The computing system of claim 1, wherein selecting a difference distance threshold for each of the categories comprises selecting a first difference distance threshold for a first category and a distance threshold for a second category different than the first difference distance threshold.

7. The computing system of claim 1, wherein the processor is further to store data associated with the target word based on the output category.

8. A method executable by a processor, comprising:
    determine a difference level threshold for a category based on difference levels between words associated with the category;
    determine difference levels between a target word and the words associated with the category; and
    if one of the difference levels of the target word is below the threshold associated with the category, output the category.

9. The method of claim 8, wherein a word associated with the category comprises at least one of: a misspelling, synonym, abbreviation, metonym, synecdoche, metalepsis, kenning, or acronym associated with the category.

10. The method of claim 8, further comprising associating the target word with a second set of related words to the category representing words not included in the associated words that have a difference level below the threshold.

11. The method of claim 8, wherein the difference level comprises an edit distance.

12. The method of claim 8, further comprising selecting a category name for the category based on the difference level between the words associated with the category.

13. A machine-readable non-transitory storage medium including instructions executable by a processor to:
   determine a difference distance threshold for each of multiple categories of words based on the difference distance between words within each of the particular categories;
   associate a target word with one of the categories based on whether the target word has a difference distance with a word in the category below the threshold for the particular category; and
   output the associated category.

14. The machine-readable non-transitory storage medium of claim 13, further comprising instructions to determine if the target word is one of the words within the multiple categories of words.

15. The machine-readable non-transitory storage medium of claim 13, further comprising instructions to:
   store information about the target word and the associated category in a second set of words associated with the category; and
   compare a future target word to the first and second set of words associated with the category.

16. The machine-readable non-transitory storage medium of claim 13, wherein the threshold of a category is determined based on the maximum difference distance between two words within the category.

17. The machine-readable non-transitory storage medium of claim 13, wherein associating the target word with one of the categories is based on the smallest distance between the target word and the associated words of a category where the distance is less than the threshold for the category.

* * * * *